(12) United States Patent
Hansing et al.

(10) Patent No.: US 10,467,024 B2
(45) Date of Patent: Nov. 5, 2019

(54) SYSTEM AND METHOD FOR BUS ARRANGEMENT COMMUNICATIONS

(71) Applicant: EATON INTELLIGENT POWER LIMITED, Dublin (IE)

(72) Inventors: Matthias Hansing, Bad Honnef (DE); Franz Heller, Sankt Augustin (DE); Peter Thiessmeier, Wachtberg (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/781,487

(22) PCT Filed: Dec. 6, 2016

(86) PCT No.: PCT/EP2016/079820
§ 371 (c)(1),
(2) Date: Jun. 5, 2018

(87) PCT Pub. No.: WO2017/097730
PCT Pub. Date: Jun. 15, 2017

(65) Prior Publication Data
US 2018/0373549 A1  Dec. 27, 2018

(30) Foreign Application Priority Data
Dec. 7, 2015 (DE) .......... 10 2015 121 288

(51) Int. Cl.
*G06F 13/40* (2006.01)
*G06F 9/445* (2018.01)
(Continued)

(52) U.S. Cl.
CPC ...... *G06F 9/44505* (2013.01); *G06F 13/1684* (2013.01); *G06F 13/4027* (2013.01);
(Continued)

(58) Field of Classification Search
CPC combination set(s) only.
See application file for complete search history.

(56) References Cited

U.S. PATENT DOCUMENTS 5,226,123 A * 7/1993 Vockenhuber ........... H04Q 9/00
710/316
6,473,839 B1  10/2002 Kremser et al.
(Continued)

FOREIGN PATENT DOCUMENTS

DE 3736081 A1 5/1989
DE 4340048 A1 6/1995
(Continued)

*Primary Examiner* — Raymond N Phan
(74) *Attorney, Agent, or Firm* — Leydig, Voit & Mayer, Ltd.

(57) ABSTRACT

A bus arrangement includes a coordinator that has a non-volatile memory; a first node that has a first serial number; a second node that has a second serial number; and a bus. The bus includes a first signal line, which couples the first node and the coordinator; a second signal line, which connects the second node to the first node; and at least one bus line, which connects the coordinator to the first and the second nodes. The coordinator is configured such that, in a configuration phase, it establishes a connection to the first node, queries the first serial number, and stores the first serial number in the non-volatile memory, and establishes a connection to the second node, queries the second serial number, and stores the second serial number in the non-volatile memory.

12 Claims, 6 Drawing Sheets

(51) Int. Cl.
*H04L 12/403* (2006.01)
*H04L 29/12* (2006.01)
*G06F 13/16* (2006.01)
*H04L 12/40* (2006.01)

(52) U.S. Cl.
CPC ........ *H04L 12/403* (2013.01); *H04L 61/2038* (2013.01); *H04L 2012/4026* (2013.01)

(56) References Cited

U.S. PATENT DOCUMENTS

| | | | | |
|---|---|---|---|---|
| 8,473,656 | B2* | 6/2013 | Kuschke | H04L 12/40189 710/110 |
| 8,874,816 | B2* | 10/2014 | Tailliet | G06F 13/364 710/110 |
| 2008/0091862 | A1* | 4/2008 | Hiraka | H04B 10/278 710/110 |
| 2009/0185215 | A1* | 7/2009 | Kreppold | G06F 12/0661 358/1.15 |
| 2013/0318267 | A1* | 11/2013 | Chapelle | G06F 13/4291 710/110 |
| 2013/0326099 | A1 | 12/2013 | Schmidt et al. | |
| 2014/0052863 | A1* | 2/2014 | Hart | H04L 67/12 709/226 |
| 2016/0103773 | A1* | 4/2016 | Sauer | G06F 13/16 710/110 |
| 2017/0046292 | A1* | 2/2017 | Teuke | G06F 12/0646 |

FOREIGN PATENT DOCUMENTS

| | | |
|---|---|---|
| DE | 4407895 A1 | 9/1995 |
| DE | 19740306 A1 | 9/1999 |
| DE | 29907265 A1 | 9/1999 |
| DE | 10240832 A1 | 3/2004 |
| DE | 102007028387 A1 | 8/2008 |
| WO | WO 2005050924 A1 | 6/2005 |
| WO | WO 2012041753 A1 | 4/2012 |

* cited by examiner

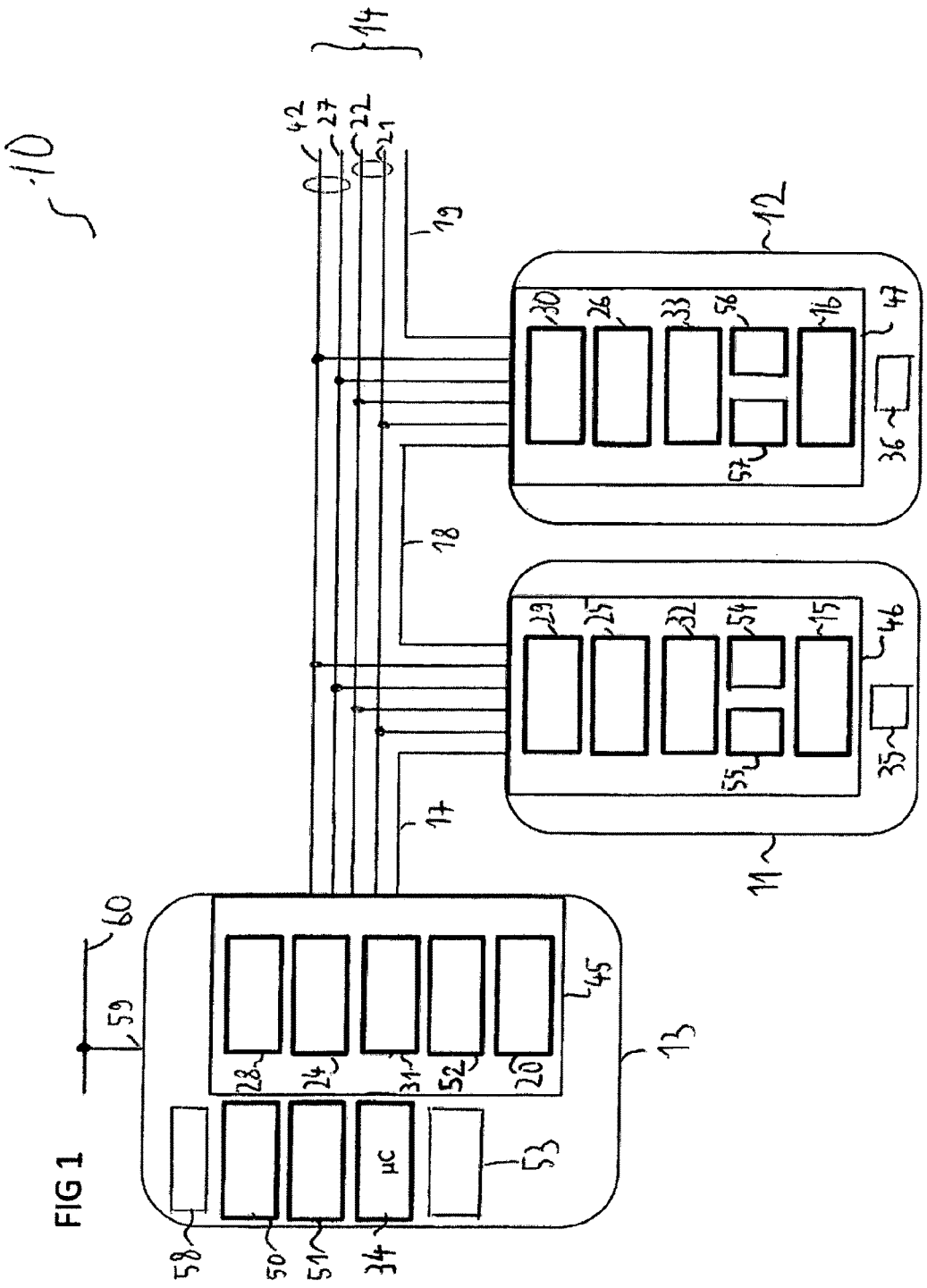

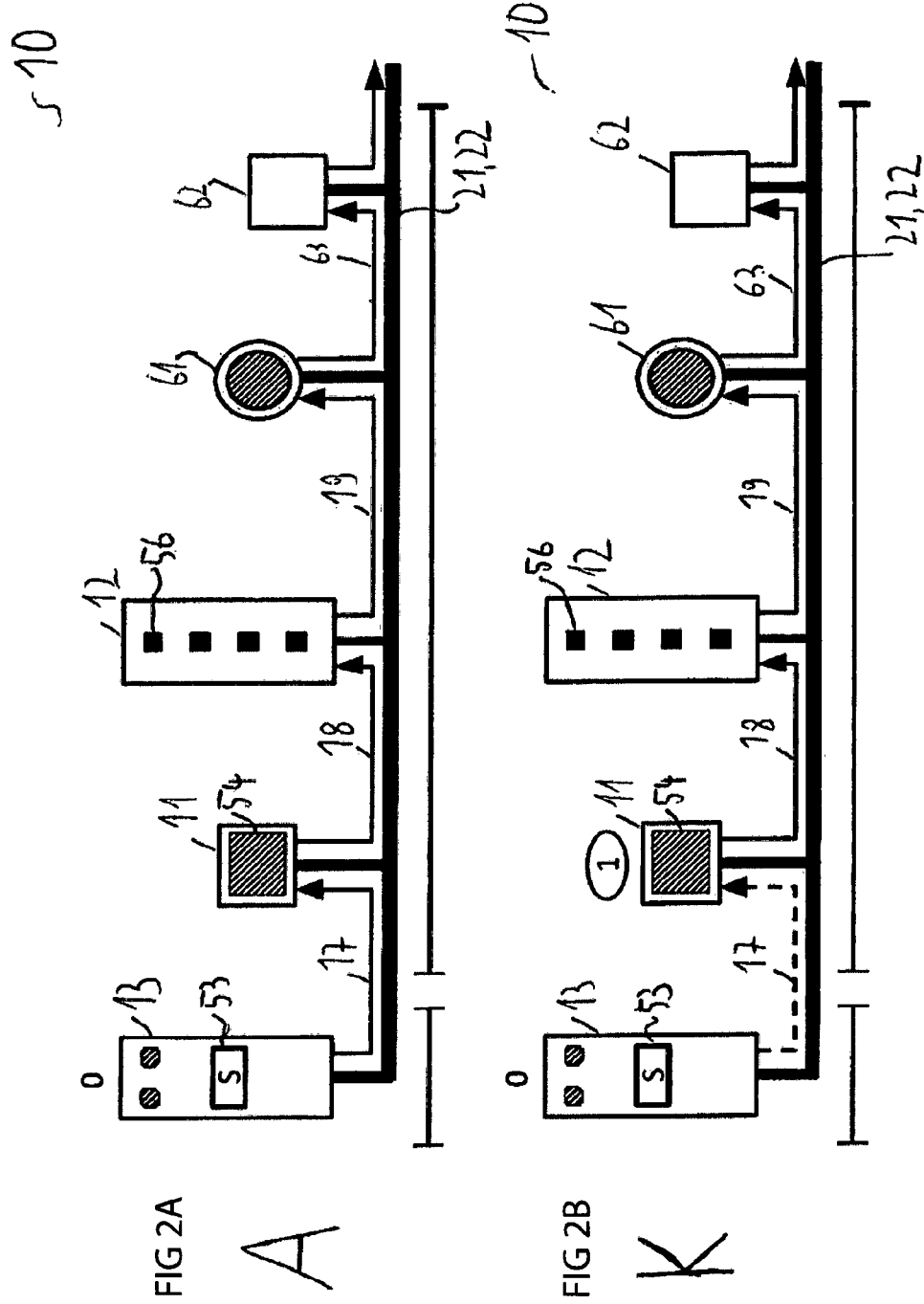

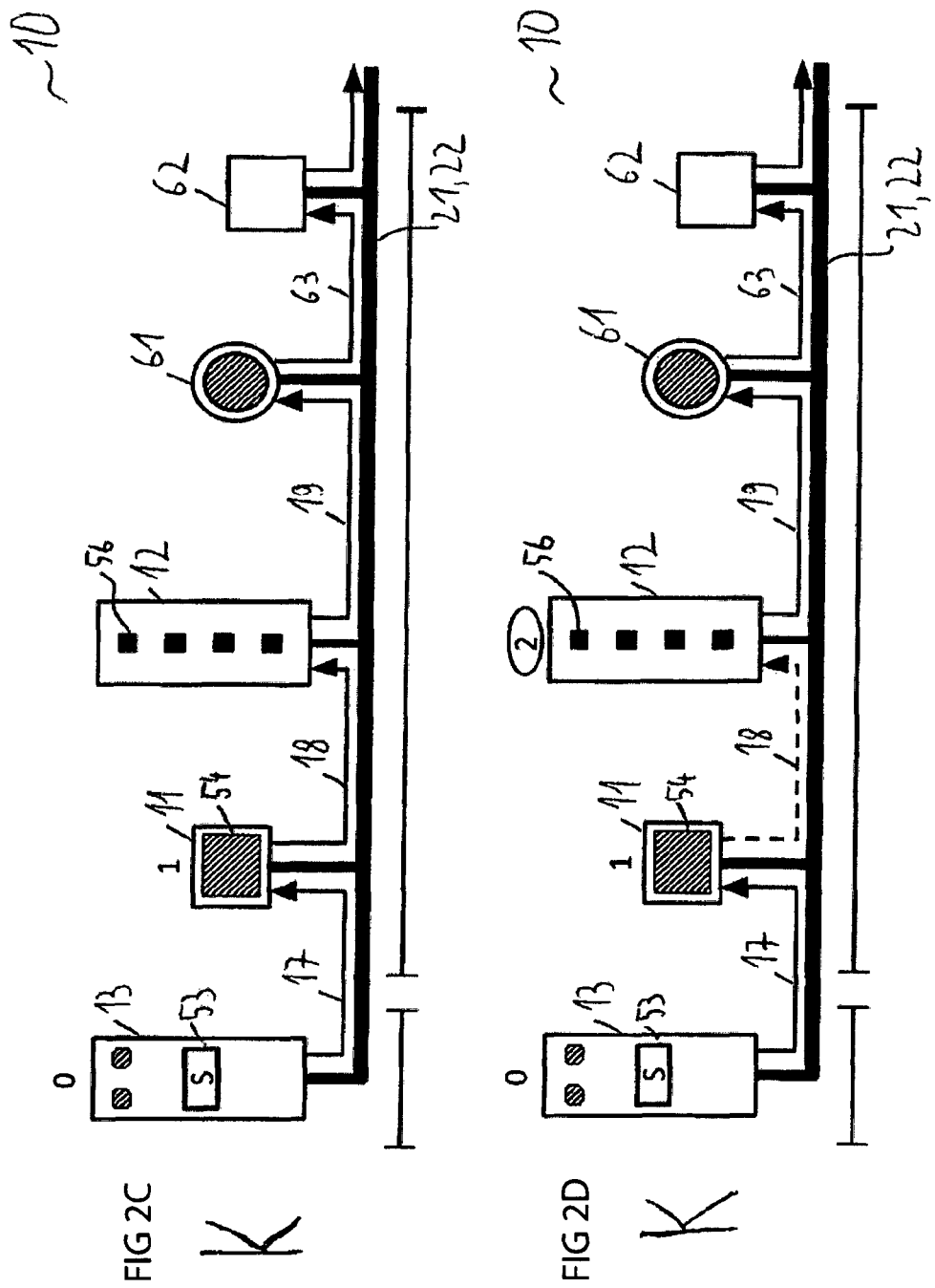

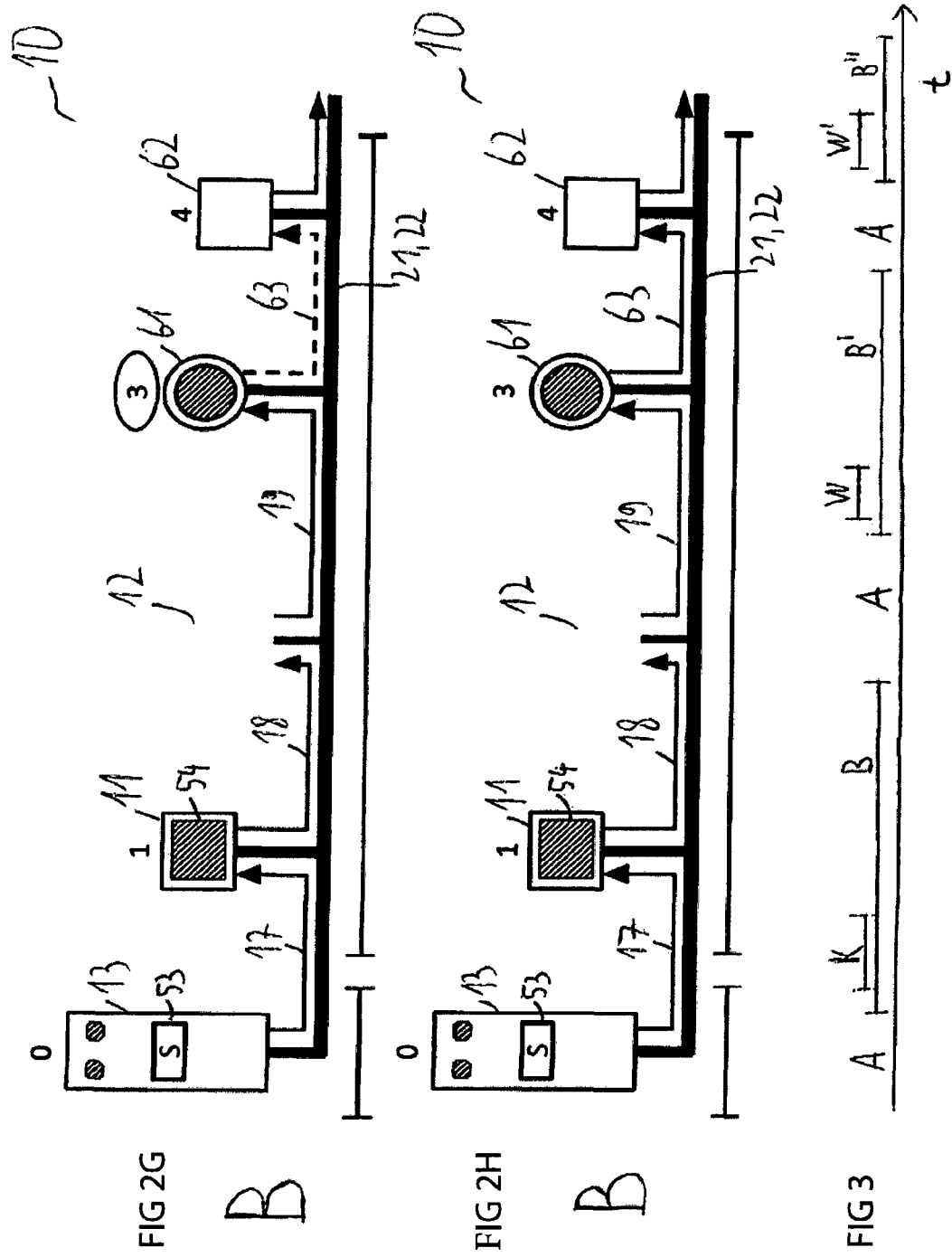

SYSTEM AND METHOD FOR BUS ARRANGEMENT COMMUNICATIONS

CROSS-REFERENCE TO PRIOR APPLICATIONS

This application is a U.S. National Stage Application under 35 U.S.C. § 371 of International Application No. PCT/EP2016/079820 filed on Dec. 6, 2016, and claims benefit to German Patent Application No. DE 10 2015 121 288.9 filed on Dec. 7, 2015. The International Application was published in German on Jun. 15, 2017 as WO 2017/097730 A1 under PCT Article 21(2).

FIELD

The present invention relates to a bus arrangement and a method for operating a bus arrangement.

BACKGROUND

A bus arrangement may be used in automation technology, by way of example. A bus arrangement typically has one coordinator and several nodes. The nodes may be embodied as actuators or sensors. The actuators may be switching devices, such as contactors, motor starters and circuit breakers, command devices and frequency converters.

SUMMARY

In an embodiment, the present invention provides a bus arrangement that includes a coordinator that has a non-volatile memory; a first node that has a first serial number; a second node that has a second serial number; and a bus. The bus includes a first signal line, which couples the first node and the coordinator; a second signal line, which connects the second node to the first node; and at least one bus line, which connects the coordinator to the first and the second nodes. The coordinator is configured such that, in a configuration phase, it establishes a connection to the first node, queries the first serial number, and stores the first serial number in the non-volatile memory, and establishes a connection to the second node, queries the second serial number, and stores the second serial number in the non-volatile memory.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 illustrates an exemplary embodiment of a bus arrangement;

FIGS. 2A to 2H illustrates an exemplary embodiment of a bus arrangement in different phases;

FIG. 3 illustrates an exemplary chronological sequence of phases in a bus arrangement.

DETAILED DESCRIPTION

Figure 2E:
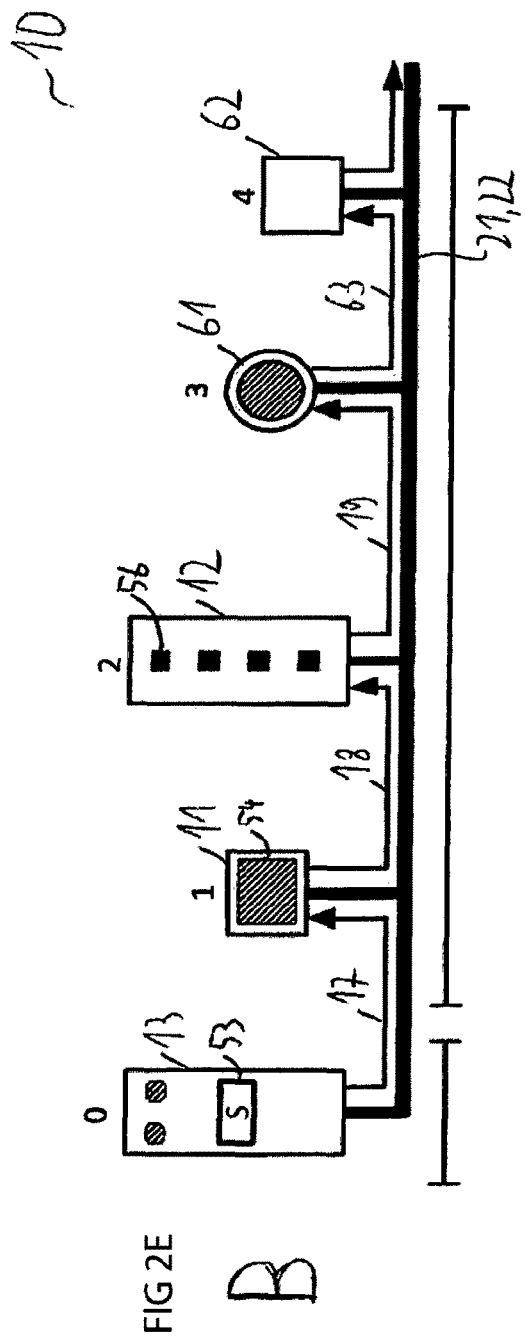

Embodiments of the present invention provide an arrangement and a method for operating a bus arrangement in which the information suited for addressing is stored in the coordinator.

In an embodiment, the bus arrangement includes a coordinator, a first and a second node, and a bus. The coordinator has a non-volatile memory. The first node has a first serial number and the second node has a second serial number. The bus includes a first signal line which couples the first node and the coordinator. Furthermore, the bus includes a second signal line which connects the second node to the first node. In addition, the bus includes at least one bus line which connects the coordinator to the first and the second nodes. In this case, the coordinator is designed to establish a connection to the first node in a configuration phase, to query the first serial number, and to store the first serial number in the non-volatile memory. Furthermore, the coordinator is designed to establish a connection to the second node, to query the second serial number, and to store the second serial number in the non-volatile memory.

Advantageously, the first and the second nodes have unique serial numbers. Since the first node differs from the second node on the basis of the respective serial number, it is possible to address the node via the serial number. The first serial number is a globally unique number that is stored in the first node during the production of the first node. Accordingly, the second serial number is also a unique number which is stored in the second node during the production of the second node.

In an embodiment, the first node has a first non-volatile memory in which the first serial number is stored. Accordingly, the second node has a second non-volatile memory in which the second serial number is stored. The first and the second non-volatile memories may be permanent memories, by way of example, such as a read only memory—abbreviated as ROM—a programmable read only memory—abbreviated as PROM—or a one-time programmable device—abbreviated as OTP module.

In an embodiment, the non-volatile memory of the coordinator retains the first and the second serial numbers. As such, the non-volatile memory of the coordinator continues to store the first and the second serial numbers even if the coordinator power supply is interrupted. The non-volatile memory may be a semi-permanent memory, such as an electrically erasable programmable read only memory—abbreviated as EEPROM—or a flash EEPROM.

In an embodiment, the first signal line connects the first node to the coordinator. The first node and the coordinator are thus directly and permanently connected to each other via the first signal line.

In an embodiment, the second node is directly and permanently connected to the first node via the second signal line. The second node is not directly connected to the first signal line. The second node is exclusively coupled to the first signal line via the first node. Accordingly, the coordinator is not directly connected to the second signal line. The coordinator is coupled to the second signal line via the first node.

Both the coordinator and the first node, and also the second node, are directly connected to the at least one bus line.

In an embodiment, the at least one bus line of the bus is provided as exactly one bus line.

In an alternative embodiment, the bus has the at least one bus line, and also a further bus line. Thus, the bus has exactly two bus lines—specifically a first and a second bus line. The first and the second bus lines may be operated according to the TIA/EIA-485 A standard, also called EIA-485 or RS-485.

In an embodiment, the bus arrangement includes one or more further nodes which are connected to the at least one bus line. Another node may be connected to the second node via a third signal line. However, the other node(s) may also be arranged, for example, between the coordinator and the first node.

In an embodiment, at least one of the nodes is realized as an actuator, measuring device or sensor. The actuator may be a switching device—such as a contactor, a motor starter or a power switch—a control device, a command device, a signaling device, an operating unit, or a frequency converter.

In an embodiment, the coordinator compares the first serial number stored in the non-volatile memory with the second serial number stored in the non-volatile memory. The coordinator provides a signal according to the result of the comparison. The signal thus represents the information regarding whether the two serial numbers are identical. If the serial numbers are identical, an error has occurred.

In the event that the bus arrangement includes the first and the second node as well as a further node with a further serial number, or several further nodes with a plurality of further serial numbers, the coordinator compares the first and the second serial numbers and the further or serial number(s) with each other. The coordinator provides the signal representing the information that least two serial numbers are identical.

In an embodiment, the configuration phase is part of an operating phase. The operating phase is followed by a power-off phase, and then a further operating phase which begins with a restart phase. As the process continues, further operating phases which each have a restart phase at the beginning may alternate with power-off phases. As such, the restart phase follows the configuration phase.

In an embodiment, in the restart phase, the coordinator establishes a connection to the first and the second nodes, polls the first and the second serial numbers, and compares the queried first and second serial numbers with the first and the second serial numbers stored in the non-volatile memory. Advantageously, the coordinator may thus determine whether a node has been replaced—for example, in the power-off phase before the restart phase.

In an embodiment, the coordinator outputs a signal with the information if it is determined by the comparison in the restart phase that the queried first serial number is different from the first serial number stored in the non-volatile memory, and/or the queried second serial number is different from the second serial number stored in the non-volatile memory. With this signal, the coordinator may thus inform the operator of the bus arrangement or a superordinate controller of the bus arrangement that one of the nodes has been replaced.

In an embodiment, the coordinator may be placed in a replacement mode or a replacement operation. If the coordinator is in the replacement mode or in the replacement operation, the coordinator then establishes a connection to the first and the second node during the restart phase, queries the first and the second serial numbers, and stores the queried first and second serial numbers in the non-volatile memory in place of the first and the second serial numbers previously stored in the non-volatile memory. Optionally, in this case as well, the coordinator outputs the signal with the information that, upon comparison, the queried first serial number is different from the first serial number previously stored in the non-volatile memory and/or the queried second serial number is different from the second serial number previously stored in the non-volatile memory.

In an embodiment, the first node includes a first volatile memory. The second node may include a second volatile memory. The first and the second volatile memories may be implemented, for example, as random access memory—abbreviated as RAM—or flash memory. The RAM may be implemented as a dynamic random access memory, abbreviated as DRAM, or static random access memory, abbreviated as SRAM. The first and the second volatile memories lose their memory content in the power-off phase.

In an embodiment, the coordinator activates the first node in the configuration phase via the first signal line and transmits a telegram containing a first node address to all nodes and thus also to the first and the second nodes, via the at least one bus line. The first node stores the first node address in the first volatile memory. Due to the fact that exactly one node is activated, specifically the first node in this case, only this node stores the node address provided via the at least one bus line. Such a telegram sent to all nodes via the bus line may also be referred to as a broadcast message. Since, in the operating phase, the first node continues to store, in the first volatile memory, the first node address which was introduced in the configuration phase, it may be addressed by means of the first node address. The first node may be activated directly by the coordinator—or, if further nodes are arranged between the coordinator and the first node, via the node preceding the first node.

In an embodiment, the first node activates the second node in the configuration phase via the second signal line. The coordinator transmits a telegram containing the second node address via the at least one bus line to all nodes—and therefore to the first and the second nodes. The second node stores the second node address in the second volatile memory. Because, in the period in which the telegram with the second node address is sent, only the second node is activated, only the second node transfers the second node address to its volatile memory.

The second node is only activated by the first node if the first node has been activated previously and the first node has stored the first node address in the first volatile memory.

In an embodiment, the coordinator and nodes form a series connection or chain which may be referred to as a daisy chain. Thus, the coordinator and the nodes form a daisy-chain arrangement or a daisy-chain bus. The coordinator and the nodes are connected in series via the signal lines. The first node may be connected directly to the coordinator. The other nodes are each connected to their predecessors.

In an embodiment, the first node includes a transceiver which is coupled to the first volatile memory and the first non-volatile memory. Likewise, the second node may include a transceiver which is coupled to the second volatile memory and the second non-volatile memory. The transceivers may be realized as bus transceivers. The transceivers may be designed for the interface standard TIA/EIA-485 A, also called EIA-485 or RS-485.

In an embodiment, in an operating phase, for example after the configuration phase or after the restart phase, the coordinator transmits via the at least one bus line a telegram which contains either the first node address or the first serial number, and also data, to all nodes and thus also to the first and the second nodes. The transceiver of the first node recognizes the first node address and the first serial number, such that the first node processes the data in the telegram. The first node may thus be addressed by a telegram containing only the first node address and data, as well as by a telegram containing only the first serial number and data. The first node may thus be addressed in two ways via the at least one bus line. In addition, the first node may also be activated via the first signal line. The second and further nodes may also recognize the second node address and the second serial number and/or the further node addresses and the further serial numbers, such that the second and/or further nodes process the data in the telegram.

In an embodiment, in the operational phase, the coordinator identifies a failure of a node—for example, the first and/or the second node—and stores information in the non-volatile memory about the failure of the node—for example, the first and/or the second node. The coordinator registers the failed nodes as failed. The failure of a node may be triggered, by way of example, by a defect in the node or by the removal of the node and thus the absence of the node. As such, in the non-volatile memory of the coordinator, both the associated serial number and the information as to whether the node has failed or is active are stored for each node address.

In an embodiment, the coordinator may re-activate a failed node. The activation may be performed in the forward direction as well as in the reverse direction.

In an embodiment, only a single node has failed. As such, it is not the case that two or more nodes positioned consecutively on the bus have failed. A single node may be activated in the forward direction. For this purpose, the coordinator transmits a telegram to all nodes, and thus also to the first and the second nodes, with the serial number of the node which lies between the coordinator and the failed node—specifically immediately before the failed node. The telegram contains a command to output a signal to the signal line to activate the failed node. The failed node confirms its activation via the at least one bus line.

Subsequently, the coordinator stores the information about the operational capability of the now-functional node in the non-volatile memory.

For example, in one embodiment, the second node has failed and the first node is functional. As such, the coordinator transmits a message containing the first serial number and an instruction to output a signal to the second signal line to all nodes, and thus also to the first and the second node, via the at least one bus line. The first node activates the second node via the second signal line, and the second node confirms the activation to the coordinator. The coordinator then stores the information about the operational capability of the second node in the non-volatile memory.

In an embodiment, two or more consecutive nodes have failed. The failed node closest to the coordinator may be activated in the forward direction by the previous node as described above. However, if the activation in the forward direction is not possible because, for example, a node is not activated or not available, an activation may be performed in the reverse direction.

For example, in one embodiment, the first node and a further node lying between the coordinator and the first node have failed. At a later point in time during the operating phase, the coordinator may send a telegram containing the first serial number and an instruction for outputting a signal to the second signal line to all nodes via the at least one bus line, and thus also to the first and the second nodes. The first node, insofar as it may be activated again, activates the second node via the second signal line, such that the second node confirms the activation to the coordinator via the at least one bus line. The coordinator then stores the information about the operational capability of the first node in the non-volatile memory. As such, despite a gap between the first node and coordinator, the first node may be activated in the reverse direction by means of the second node.

In an embodiment, the bus arrangement includes a coordinator, a first and a second node, and a bus. The bus includes a first signal line which couples the first node and the coordinator, and a second signal line. Furthermore, the first node includes a switchable current sink. The second node includes a power source and a comparator. The second signal line couples the switchable current sink to the power source.

In an embodiment, to activate the second node, the first node is designed to switch the switchable current sink between a conducting and a non-conducting state. The second node is designed to detect the change in an input voltage of the second node by means of the comparator. The change in the current flowing through the second signal line may be detected in this way.

This bus arrangement may be realized with or without storage of the serial numbers in the coordinator.

In an embodiment, a method for operating a bus arrangement includes the following steps in a configuration phase: The coordinator establishes a connection to a first node having a first serial number via a bus having at least one bus line. The first node transmits the first serial number to the coordinator via the at least one bus line. The coordinator stores the first serial number in a non-volatile memory of the coordinator. The coordinator establishes a connection to a second node with a second serial number via the bus with at least one bus line. The second node transmits the second serial number to the coordinator via the at least one bus line. The coordinator stores the second serial number in the non-volatile memory of the coordinator. The bus additionally includes a first signal line which couples the first node and the coordinator, and a second signal line which connects the second node to the first node. The at least one bus line connects the coordinator to the first and the second nodes.

Advantageously, via the storage of the first and the second serial numbers in the non-volatile memory of the coordinator, information is present in the coordinator which makes it possible to address the first and the second node each with unique numbers.

The bus arrangement allows combined addressing of nodes. The bus arrangement may also be referred to as a bus system. An exchange of bus segments in operation is possible due to the combined addressing. The bus arrangement has a restart procedure. The restart procedure is possible without re-addressing.

The bus arrangement may perform an addressing procedure via daisy-chain and via the unique serial number, such that a further addressing of the nodes is possible upon a restart even without a daisy chain.

Each time the bus arrangement is first powered up, a daisy-chain procedure is used. All nodes on the bus are addressed by the coordinator with an ascending address sequence. In this procedure, a unique serial number is queried by each bus node, and is stored in an integrated circuit which, inter alia, performs the bus communication. In this case, a globally unique number is stored in the integrated circuit during the production process. The integrated circuit may be implemented as an application-specific integrated circuit, abbreviated as ASIC. The integrated circuit may include the transceiver and the non-volatile memory of the node. In addition, a device identity (vendor, device) which indicates the type of device (e.g. Eaton, switch, 200 amp, type number) is read out. The addressing procedure ends at the first missing node and/or at the last possible node to be addressed. The unique serial number belonging to each addressed node is retained at the coordinator together with its node address.

Using this method, bus segments may be switched off, switched on again, and also replaced in an operating mode provided for this purpose. The daisy chain stands for the geographical position in this case, and the replacement is possible via the stored device identity (vendor, device). The new serial numbers of the replaced devices and/or nodes are then replaced in the remanent configuration of the coordinator.

For example, upon a restart of the coordinator, the bus nodes are addressed without a daisy chain.

The corresponding unique hardware serial number which was determined during initial configuration may then be verified with the remanent via the daisy chain. This prevents misaddressing.

All serial numbers in the bus arrangement are checked to avoid duplicate addressing.

If one or more nodes are not recognized—for example, due to an interruption of the daisy chain (e.g. in the event of a missing or faulty node)—the addressing may be continued with the unique hardware serial number even without a daisy chain. This means that each node in the system has a unique serial number (this serial number is given to each ASIC during production), and if the signal line (daisy chain) goes down, it may then be addressed precisely via this serial number. This is done in a telegram which is transmitted via the bus system, and only this node may use this information for itself, and then respond to it. Everything else is then controlled by the coordinator.

This method is also used as an option in operation, in the event of an outage of bus segments and the reconnection of nodes.

By means of the two combined addressing methods, bus segments may be replaced during operation. The daisy chain is used and the device ID (vendor, device) is read out and compared. The new serial numbers of the replaced nodes are replaced in the remanent configuration of the coordinator when a special operating mode—such as a replacement mode—has been selected.

The invention will be explained in more detail below with reference to several embodiments and to the figures. Components or functional units with the same functionality and/or effects are indicated by the same reference numerals. Where components or functional units correspond in function, their description will not be repeated.

FIG. 1 shows an exemplary embodiment of a bus arrangement 10, including a first and a second node 11, 12, 61, 62, a coordinator 13, and a bus 14. The coordinator 13 is connected to the first and the second nodes 11, 12 via the bus 14. The first and the second nodes 11, 12, 61, 62 each have a processor core 15, 16. The bus 14 includes a first signal line 17 which connects a terminal of the coordinator 13 to a terminal of the first node 11 and therefore—for example—to a terminal of the processor core 15 of the first node 11. The first signal line 17 is not connected directly to the second or to a further node 12. For reasons of clarity, the lines in the coordinator 13 and in the first and the second nodes 11,12 are not shown.

Furthermore, the bus 14 includes a second signal line 18 which connects a terminal of the first node 11 to a terminal of the second node 12. For example, the second signal line 18 connects the processor core 15 of the first node 11 to the processor core 16 of the second node 12. In addition, the bus 14 may include a third signal line 19 which connects a terminal of the second node 12 to a third node, which is not shown. The coordinator 13 includes a processor core 20 which is connected to the first signal line 17. The bus 14 is provided as a linear bus. The bus 14 may be designed as a serial bus. The coordinator 13 may be implemented as a master. The nodes 11, 12 may be provided as slaves. The processor core 15, 16, 20 may be implemented as a microprocessor.

The processor core 20 of the coordinator 13 is connected to the first signal line 17 via a signal line circuit 31 of the coordinator 13. Furthermore, the processor core 15 of the first node 11 is connected to the first and the second signal line 17, 18 via a signal line circuit 32 of the first node 11. The processor core 16 of the second node 12 is connected via a signal line circuit 33 of the second node 12 to the second and, if present, also to the third signal line 18, 19.

In addition, the bus 14 includes at least one bus line 21 which connects the coordinator 13 to all of the nodes, and thus to the first and the second nodes 11, 12. A signal on the at least one bus line 21 reaches all nodes 11, 12, 61, 62. The bus 14 may include a further bus line 22 which connects the coordinator 13 to all of the nodes 11, 12, 61, 62. The at least one bus line 21 and the further bus line 22 may also be referred to as the first and the second bus line. The coordinator 13 includes a transceiver 24 which couples the processor core 20 to the first and the second bus lines 21, 22. The first and the second nodes 11, 12 also each include a transceiver 25, 26 with two terminals which are connected to the first and the second bus lines 21, 22. In the first and the second nodes 11, 12, 61, 62, the transceiver 25, 26 is coupled to the processor core 15, 16, respectively. The first and the second bus lines 21, 22, and the transceivers 24-26 of the coordinator 13 and of the nodes 11, 12 may be implemented in accordance with the TIA/EIA-485 A standard. The transceivers 24-26 of the coordinator 13 and the nodes 11, 12, 61, 62 may be designed as transmit and receive transceivers and implemented for half-duplex operation.

In addition, the bus 14 includes a power supply line 27 which connects a power supply 28 of the coordinator 13 to a power supply 29 of the first node 11 and a power supply 30 of the second node 12. Each of the power supplies 28, 29, 30 may be realized as a voltage regulator.

Furthermore, the first and the second node 11, 12 may each have an application device 35, 36. The application device 35, 36 may be implemented as an actuator, measuring device or sensor device. As such, the first and the second nodes 11,12 may be realized as an actuator, measuring device and/or sensor. The application device 35 of the first node 11 is coupled to the processor core 15 of the first node 11. The same is true for the second node 12. Furthermore, the bus 14 includes a reference potential line 42 which connects a reference potential terminal of the coordinator 13 to reference potential terminals of the first and the second nodes 11, 12. The power supply line 27 and the reference potential line 42 facilitate the supply of power to the nodes 11, 12, 61, 62 by the coordinator 13.

In addition, the coordinator 13 includes a memory 53 which is connected to the processor core 20 or to a microcontroller 34 of the coordinator 13. The memory 53 may be realized as a non-volatile memory. Furthermore, the coordinator 13 includes a volatile memory 52. The first node 11 includes a first volatile memory 54 and a first non-volatile memory 55 which may be connected to the transceiver 25. The second node 12 includes a second volatile memory 56 and a second non-volatile memory 57 which may be connected to the transceiver 26. The volatile memories 52, 54, 56 may each be realized as random access memory—abbreviated as RAM—or flash memory.

The coordinator 13 includes an integrated circuit 45 which may be implemented as an ASIC. The integrated circuit 45 may include the power supply 28, the transceiver 24, the signal line circuit 31, the volatile memory 52, and the processor core 20. Furthermore, the first and the second node 11, 12 each include an integrated circuit 46, 47, which may be realized as an ASIC. The integrated circuit 46 of the first node 11 may include the power supply 29, the transceiver 25, the signal line circuit 32, the first volatile memory 54, the first non-volatile memory 55, and the processor core 15. Accordingly, the integrated circuit 47 of the second node 12 may include the power supply 30, the transceiver 26, the signal line circuit 33, the second volatile memory 56, the second non-volatile memory 57, and the processor core 16.

The coordinator 13 includes a further transceiver 58 which couples a further bus terminal 59 to the microcontroller 34. Furthermore, the bus arrangement 10 includes a field bus 60 which is connected to the further bus terminal 59. The coordinator 13 may be a gateway, router or switch. The coordinator 13 has an oscillator 50. The oscillator 50 may be designed as an RC oscillator. The oscillator 50 may be used for timing. The coordinator 13 may have a further memory 51 realized as RAM or flash memory.

The bus 14 is realized as a ribbon cable or round cable. According to FIG. 1, the bus 14 may consist of five wires, for example. Alternatively, the bus 14 may have a different number of wires—for example, eight wires.

The functionality of the bus arrangement 10 according to FIG. 1 will be explained with reference to FIGS. 2A to 2H.

FIGS. 2A to 2H show an exemplary embodiment of a bus arrangement 10, which is a development of the embodiment shown in FIG. 1. The bus arrangement 10 includes the coordinator 13, the first and the second nodes 11, 12, and also a third and a fourth node 61, 62. The coordinator 13 is connected directly to the first node 11 via the first signal line 17. The first node 11 is connected via the second signal line 18 directly to the second node 12. Accordingly, the second node 12 is connected directly to the third node 61 via the third signal line 19. Furthermore, the third node 61 is connected to the fourth node 62 via a fourth signal line 63. The first to the third signal lines 17, 18, 19, 63 form a daisy chain. In addition, the coordinator 13 is connected directly to all of the nodes 11, 12, 61, 62 via the at least one bus line 21 and the further bus line 22, which are also referred to as the first and the second bus lines.

FIG. 2A shows the bus arrangement 10 in a power-off phase A. The power-off phase A is followed by an operating phase B, by way of example, which begins with a configuration phase K. Alternatively, the power-off phase A may be before a further operating phase B' which begins with a restart phase W. The coordinator 13 has an address, for example 0. No node addresses are saved in the first to the fourth nodes 11, 12, 61, 62. In FIGS. 2B to 2E, the nodes 11, 12, 61, 62 are successively addressed from left to right via the coordinator 13 and by means of the daisy chain, and the geographical positions and thus the order of the nodes 11, 12, 61, 62 are established.

In an alternative embodiment which is not shown, the coordinator 13 is coupled to the first node 11 via the first signal line 17 and one or more further nodes, as well as one or more further signal lines.

FIG. 2B shows the bus arrangement 10 according to FIG. 2A in the configuration phase K. The coordinator 13 activates the first node 11 via the first signal line 17. The first signal line 17 is drawn with a dashed line to indicate the activation. After the activation, the coordinator 13 transmits a telegram to all of the nodes 11, 12, 61, 62 via the first and the second bus lines 21, 22, the telegram containing a first node address. Only the activated node, namely the first node 11, takes the first node address contained in the telegram into its first volatile memory 54. The first node address may be 1.

As explained, the coordinator 13 sets its daisy-chain and transmits—to all nodes 11, 12, 61, 62 as a broadcast via the RS 485 bus line/data line 21, 22 of the bus 14—the node address 1 which will be assigned. At this time, only the daisy chain at the first node 11 is active, such that it interprets the node address with the number 1 received from the coordinator 13 as its address. From this point forward, the first node 11 may receive telegrams with the previously received node address.

FIG. 2C shows the bus arrangement 10 already shown in FIGS. 2A and 2B, in a further step of the configuration phase K. The coordinator 13 establishes a connection to the first node 1 via the first and the second bus lines 21, 22 in order to read out a first serial number of the first node 11. For this purpose, the coordinator 13 transmits a telegram to all nodes 11, 12, 61, 62, which includes the first node address and the command to furnish the serial number. The transceiver 25 of the first node 11 recognizes that the first node 11 is addressed and causes the processor core 15 of the first node 11 to transmit, via the first and the second bus lines 21, 22, the first serial number to the coordinator 13, which stores it in the non-volatile memory 53. As a result, the first node 11 is registered in the coordinator 13.

In FIG. 2C, the coordinator 13 is able to establish a connection to the first node 11 and to query its data. Among other things, the first serial number is read and linked in the coordinator 13 to the associated first node address and retained. The daisy chain is reset.

FIG. 2D shows the bus arrangement 10 which has already been shown in FIGS. 2A to 2C, in a further step in the configuration phase K. The coordinator 13 transmits a telegram to the first node 11, with the command to activate the output-side signal line—that is, the second signal line 18. The first node 11 detects, by means of its transceiver 25, that it is being addressed, and activates the second node 12 via a signal on the second signal line 18. Subsequently, the coordinator 13 transmits a telegram to all of the nodes 11, 12, 61, 62, which contains the second node address—for example, 2. However, since only the second node 12 is activated, only the second node 12 takes the second node address into its volatile memory 56. As a further step in the configuration phase K, the coordinator 13 causes the second node 12 to provide the second serial number. The second node 12 is registered by storing the second serial number in the non-volatile memory 53 of the coordinator 13.

In FIG. 2D, the first node 11 receives the order to set its daisy chain, such that the addressing may be continued. The coordinator 13 transmits a broadcast with the included node address 2. This procedure is carried out by the coordinator 13 until all nodes have been assigned a node address. Consequently, the third node 61 is activated, and a third node address, such as 3, is assigned to it—and a third serial number of the third node 61 is queried. The fourth node 62 carries out corresponding steps.

FIG. 2E shows the bus arrangement 10 which has already been shown in FIGS. 2A to 2D, in the operating phase after completion of the configuration phase K. The coordinator 13 is now able to address all nodes 11, 12, 61, 62 via the node addresses.

The addressed nodes 11, 12, 61, 62 are retained in the coordinator 13, along with the parameter and configuration data (serial numbers, manufacturer identity). By means of the unique serial number, previously recognized nodes 11, 12, 61, 62—even after failures—can be addressed by the coordinator 13 again. The addressed nodes 11, 12, 61, 62 do not retain their node addresses, and behave after a new power-up as they did at the beginning—such as in FIG. 2A.

Figure 2F:
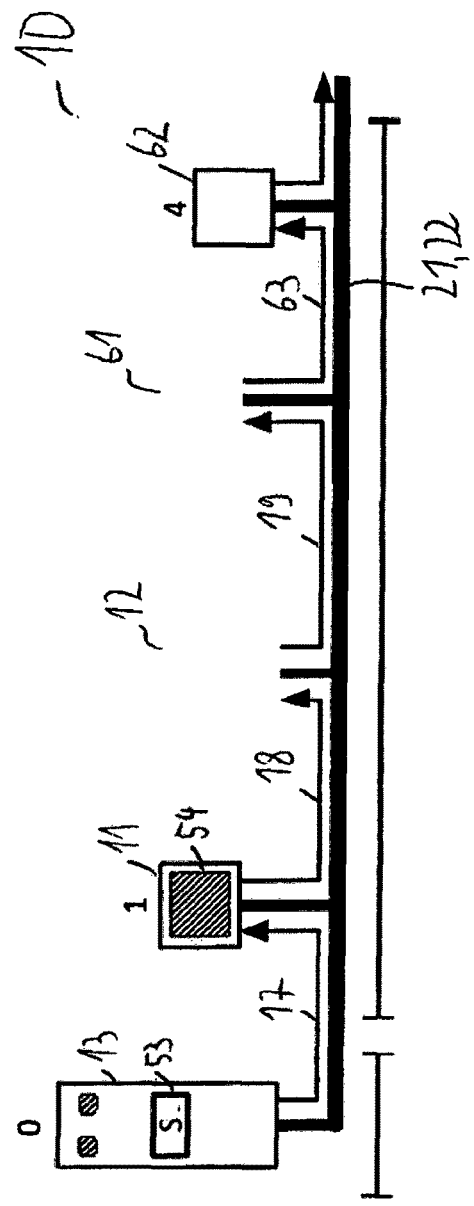

FIG. 2F shows the bus arrangement 10 as has already been explained in FIGS. 2A to 2E, in the operating phase B. In the operating phase B, nodes may fail. In the example shown in FIG. 2F, the second and third nodes 12, 61 have failed. The coordinator 13 is still able to send telegrams to the non-failed nodes 11, 62 via the first and the second bus lines 21, 22 and to control the non-failed nodes 11, 62 or to query their data. The coordinator 13 recognizes the failure of the nodes, in this case the second and the third node 12, 61, and stores information about the failure of the failed nodes 12, 61 in the non-volatile memory 53—that is, it registers them as failed.

Even after failure of nodes 12, 61, the bus arrangement 10 continues its operation. The coordinator 13 assumes the role of the failed nodes 12, 61. The volatile memory 54, 56 of the failed node (2) 12, 61 typically loses the node address during the failure.

The coordinator 13 is configured in such a manner that it reactivates one or more failed nodes, for example non-cyclically or at predetermined times.

A failed node may be repaired in a switch-off phase A, for example. In an embodiment, the failed node may also be removed in an operating phase B and used again after repair. This procedure is called a hot-swap procedure.

FIG. 2G shows the exemplary bus arrangement 10 as has already been explained in FIGS. 2A to 2F, in a part of the operating phase B. As shown in FIG. 2F, two nodes—specifically the second and the third nodes 12, 61, have failed. Only the third node 61 is available again and should be connected again. For the activation, the coordinator 13 transmits a telegram via the first and the second bus lines 21, 22 with the serial number of the failed node—that is, with the serial number of the third node 61. For example, the third node 61 may confirm receipt of the telegram to the coordinator 13. The coordinator 61 transmits a telegram to the failed node 61 with the command that it emit a signal on its output-side signal line to the subsequent node 62.

In the example of FIG. 2G, the third node 61 transmits a signal via the fourth signal line 63 to the fourth node 62. The node 62, which is located after the failed node 61 on the bus 14, informs the coordinator 13 of its activation. The coordinator 13 transmits the third node address to the third node 61, for example by means of a telegram which is addressed to the third serial number. This ensures that the node which has the third serial number is not connected at just any spot on the bus 14 when it is switched back on, but rather at the correct location—namely, immediately before the fourth node 62.

As described above, recurring nodes 61 may be addressed by the coordinator 13 without a daisy chain via the unique serial number. However, the daisy-chain of the detected node 61 is then used to determine the geographical positions during the recognition process. As such, after activation of the daisy-chain from the third node 61 to the fourth node 62, the geographical position of the third node 61 may be confirmed once again.

FIG. 2H shows the bus arrangement 10 which has already been shown in FIGS. 2A to 2G, after the steps explained with reference to FIG. 2G have been carried out. The third node 61 has now gotten back its node address 3, and may be incorporated again into the bus arrangement 10. The coordinator 13 registers in its non-volatile memory 53 that the third node 61 is active.

FIG. 3 shows an exemplary embodiment of the chronological profile of the phases. The different phases are plotted against time t. The configuration phase K is carried out at the beginning of the operating phase B. After the coordination phase is carried out, a regular operation of the bus arrangement 10, by way of example, occurs in the operating phase B. A power-off phase A occurs after the operating phase B. In the power-off phase A, the coordinator 13 and the nodes 11, 12, 61, 62 are not supplied with electrical energy. The power-off phase A is followed by a further operating phase B'. At the beginning of the further operating phase B', a restart phase W is carried out. After the restart phase W, the regular operation of the bus arrangement 10 is provided in the further operating phase B'. Further power-off phases A and further operating phases B" may follow the further operating phase B', by way of example. The failure of nodes described in FIGS. 2F to 2G, and the activation of nodes, may take place in any of the operating phases B, B', B".

In the restart phase W, the coordinator 13 performs the same steps to assign the node addresses to the nodes as in the configuration phase K. In addition, the coordinator 13 performs a comparison of the serial numbers queried in the restart phase W with the serial numbers stored in its non-volatile memory 53.

An operator may also reset the bus arrangement 10—for example, by means of a switch of the coordinator 13—such that the bus arrangement 10 starts again with an operating phase B which has a configuration phase K.

Figure 4:
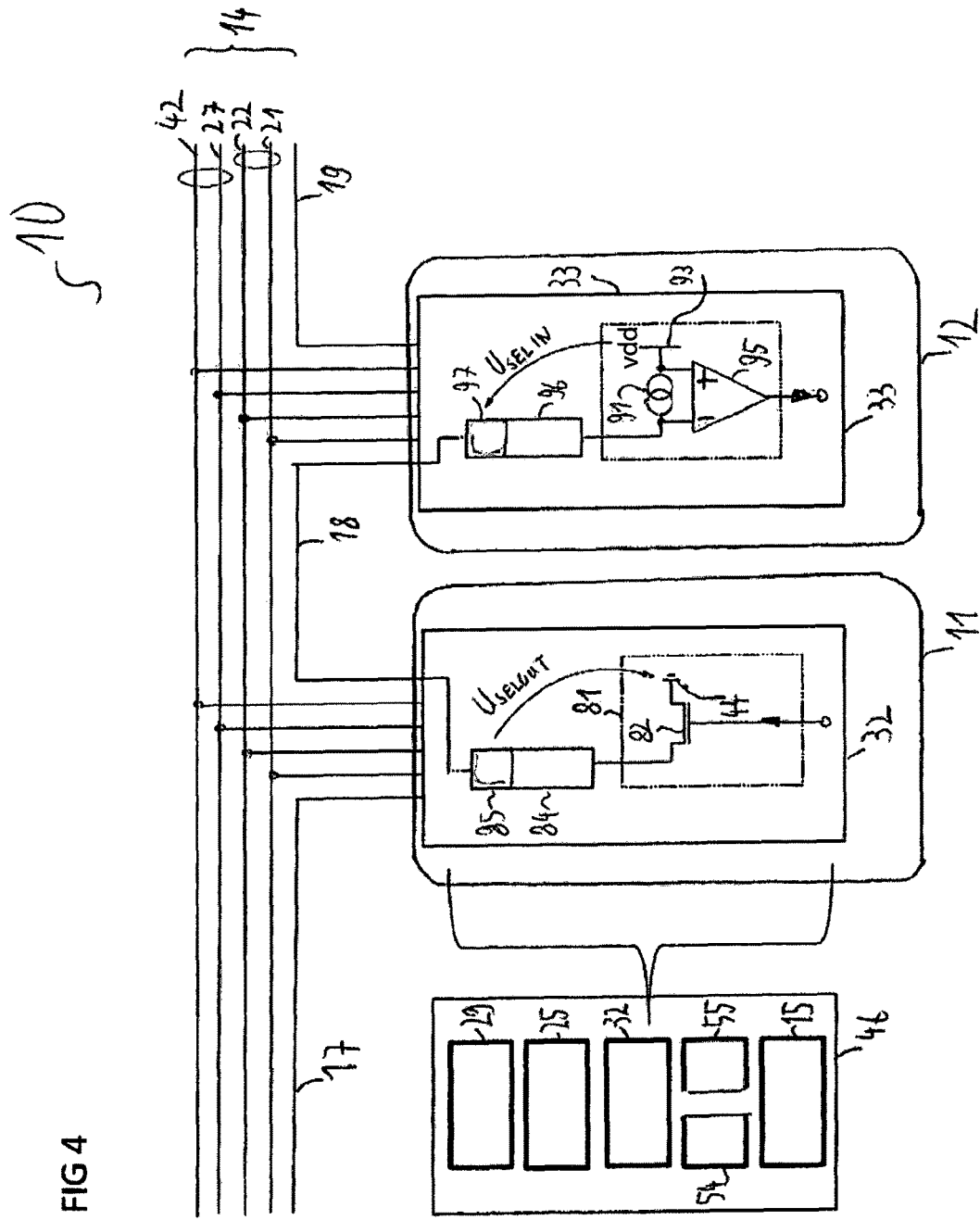
FIG. 4 illustrates an exemplary embodiment of two nodes of a bus arrangement.

FIG. 4 shows an exemplary embodiment of the first and the second nodes 11, 12 as may be realized, for example, in the bus arrangement 10 according to FIGS. 1 and 2A to 2H. The embodiment shown in FIG. 4 may also be realized independently of the above-described methods and circuit details. The signal line circuit 32 of the first node 11 has, on the output side, a switchable current sink 81. The switchable current sink 81 is arranged between the second signal line 18 and the reference potential terminal 44. The processor core 15 is connected to a control input of the switchable current sink 81. The switchable current sink 81 may have a switch 82 which controls a flow of current from the second signal line 18 to the reference potential terminal 44. The first node 11 has a pin 85 and a protective circuit 84 which couple the second signal line 18 to the switchable current sink 81. The protective circuit 84 may be implemented as a protective circuit which protects against electrostatic discharge.

The signal line circuit 33 of the second node 12 likewise includes a switchable current sink which is not shown, which is arranged between the third signal line 19 and a reference potential terminal and is realized analogously to the switchable current sink 81 of the first node 11. The coordinator 13, which is not shown in FIG. 4, also has the signal line circuit 31 with a switchable current sink, between the processor core 20 and the first signal line 17, which is implemented analogously to the switchable current sink 81.

The signal line circuit 33 of the second node 12 includes on the input side a current source 91 and a comparator 95. The comparator 95 is coupled on the output side to an input of the processor core 16. The two inputs of the comparator 95 are connected to the two terminals of the power source 91. The second node 12 has a pin 97 and a protective circuit 96 which couple the second signal line 18 to the current source 91. The protective circuit 96 may be realized as a protective circuit which protects against electrostatic discharge.

Accordingly, the signal line circuit 32 of the first node 11 also has a current source, which is not shown, which couples the first signal line 17 to a supply voltage connection and is realized analogously to the current source 91 of the second node 12.

The first node 11 activates the second node 12 in the forward direction by a procedure in which the first node 11 switches the switchable current sink 81 between a conducting state and a non-conducting state. In the conducting state of the switchable current sink 81, a current flows from the current source 91 of the second node 12 via the second control line 18 to the switchable current sink 81 of the first node 11. An output voltage $U_{SELOUT}$ may be tapped at the switchable current sink 81. At the current source 91, an input voltage $U_{SELIN}$ may be tapped. The input voltage $U_{SELIN}$ is therefore applied between the supply voltage terminal 93 and the pin 97. If the switchable current sink 81 becomes conductive, the output voltage $U_{SELOUT}$ drops from a high voltage value to almost 0 volts, and the input voltage $U_{SELIN}$ rises from a low voltage value—that is, perhaps a logical value of 1—to a high voltage value, such as a logical value of 0. The voltage value of the input voltage $U_{SELIN}$ is detected by the comparator 95. The second node 12 detects the change of the current flowing through the second signal line 18, and thus the change of the input voltage $U_{SELIN}$, by means of the comparator 95. When the current sink 82 is activated by the first node 11, a current flows from the current source 91 to the current sink 81 as already described. Thus, the input voltage $U_{SELIN}$ changes. The result is that, at pin 97 of the second node 12, instead of a logical 1 [high], a logical 0 [low] is measured—specifically for the duration of time until the first node 11 deactivates its current sink 81 once again.

The processor core 15 of the first node 11 may selectively switch the switchable current sink 81 via its connection to the switch 82 between conductive and non-conductive states. The resulting current flow through the second signal line 18 is detected by the comparator 95 and communicated to the processor core 16 of the second node 12. The comparator 95 detects a current flow or a current interruption. As such, the first node 11 forwards a signal in the forward direction via the second signal line 18 to the second node 12. In a corresponding manner, the coordinator 13 may activate the first node 11, and the second node 12 may activate the third node 61 in the forward direction. The value of the current flow is mainly limited by the current source 91—for example, to 5 mA. This prevents high energy consumption.

As described in detail above, embodiments of the invention relate to a bus assembly (10) comprising a coordinator (13) having a non-volatile memory (53), a first subscriber (11) having a first serial number, a second subscriber (12) having a second serial number, and a bus (14). Furthermore, the bus assembly (10) includes a field bus (60), which is connected to the further bus connection (59). The bus (14) includes a first signal line (17), which couples the first subscriber (11) and the coordinator (13), a second signal line (18), which connects the second subscriber (12) to the first subscriber (11), and at least one bus line (12), which connects the coordinator (13) to the first and the second subscribers (11, 12). The coordinator (13) is designed, in a configuration phase K, to establish a connection to the first subscriber (11), to query the first serial number, and to store the first serial number in the non-volatile memory (53), and to establish a connection to the second subscriber (12), to query the second serial number, and to store the second serial number in the non-volatile memory (53). Preferably, each subscriber in the system has a unique serial number (which is stored, for example, during the production process of an integrated circuit, such as an ASIC) and then can still be addressed by means of the serial number if the signal line (17, 18, 19) fails. This occurs in a telegram, which is transmitted by means of the bus system, and only the subscriber in question can use this information for itself and then react thereto. The unique serial number of each addressed subscriber is stored together with the subscriber address of the subscriber in the coordinator in a remanent manner. By means of the two combined addressing methods, bus segments can be replaced during operation. In this case, a daisy chain formed from the signal lines (17, 18, 19) is used, and the device ID (manufacturer, device) is read out and compared. In one embodiment, the coordinator detects a failure of a subscriber in the operating phase and stores information about the failure of the subscriber in the non-volatile memory.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Below is a list of reference numbers:
10 bus arrangement
11 first node
12 second node
13 coordinator
14 bus
15, 16 processor core
17 first signal line
18 second signal line
19 third signal line
20 processor core
21 at least one bus line
22 further bus line
24, 25, 26 transceiver
27 power supply line 28 node power supply
29,30 power supply
31,32, 33 signal line circuit
34 microcontroller
35, 36 application device
42 reference potential line
44 reference potential terminal
45, 46, 47 integrated circuit
50 oscillator
51 further memory.
52 volatile memory
53 volatile memory
54 first volatile memory
55 first volatile memory
56 second volatile memory
57 second nonvolatile memory
58 further transceiver
59 further bus connection
60 field bus
61 third node
62 fourth node
63 fourth signal line
81 switchable current sink
82 switch
83 protective circuit
84 pin
91 power source
93 power supply terminal
95 comparator
96 protective circuit
97 pin
A power-off phase
B, B', B" operating phase
K configuration phase
t time
$U_{SELIN}$ input voltage
$U_{SELOUT}$ output voltage
VDD supply voltage
W, W' restart phase

The invention claimed is:

1. A bus arrangement, the bus arrangement comprising:
a coordinator having a non-volatile memory;
a first node having a first serial number;
a second node having a second serial number; and
a bus comprising:
a first signal line, which couples the first node and the coordinator;
a second signal line, which connects the second node to the first node; and
at least one bus line, which connects the coordinator to the first and the second nodes,
wherein the coordinator is configured such that, in a configuration phase, it:
establishes a connection to the first node, queries the first serial number, and stores the first serial number in the non-volatile memory, and
establishes a connection to the second node, queries the second serial number, and stores the second serial number in the non-volatile memory.

2. The bus arrangement according to claim 1, wherein the coordinator is configured to compare the first serial number stored in the non-volatile memory with the second serial number stored in the non-volatile memory and to provide a signal based upon the two serial numbers being found identical.

3. The bus arrangement according to claim 1, wherein the coordinator is configured to, in a restart phase following the configuration phase, establish a connection to the first node and the second node, query the first serial number and the second serial number, and compare the queried first serial number and the queried second serial number with the first serial number and the second serial number stored in the non-volatile memory.

4. The bus arrangement according to claim 1, wherein the coordinator is configured to be placed in a replacement mode, such that, in a restart phase which follows the configuration phase, it establishes a connection to the first node and the second node, queries the first serial number and the second serial number, and stores, in the non-volatile memory, the queried first serial number and the queried second serial number in place of the first serial number and the second serial number previously stored in the non-volatile memory.

5. The bus arrangement according to claim 1,
wherein the coordinator is configured to activate the first node in the configuration phase via the first signal line, and to transmit via the at least one bus line a telegram containing a first node address to the first node and the second node, and
wherein the first node is configured to store the first node address in a first volatile memory of the first node.

6. The bus arrangement according to claim 1,
wherein the first node is configured to activate the second node in the configuration phase via the second signal line,
wherein the coordinator is configured to send a telegram containing a second node address to the first node and the second nod via the at least one bus line, and
wherein the second node is configured to store the second node address in a second volatile memory of the second node.

7. The bus arrangement according to claim 1, wherein the coordinator is configured to detect the failure of the first node and/or the second node, and to store the information about the failure of the first node and/or the second node in the non-volatile memory.

8. The bus arrangement according claim 1,
wherein the first node comprises a switchable current sink,
wherein the second node comprises a current source and a comparator, and
wherein the second signal line couples the switchable current sink to the current source.

9. The bus arrangement according to claim 5,
wherein the coordinator is configured to transmit to the first node and the second node via the at least one bus line a telegram containing either the first node address or the first serial number, and data, and
wherein a transceiver of the first node is configured to recognize the first node address and the first serial number, such that the first node processes the data in the telegram.

10. The bus arrangement according to claim 7,
wherein the coordinator is configured such that, after the storage of the information about the failure of the first node, the coordinator transmits to the first node and the second node, via the at least one bus line, a telegram which contains the first serial number and a command to output a signal to the second signal line,
wherein the first node is configured to activate the second node via the second signal line in response to receiving the command,
wherein the second node is configured to confirm the activation to the coordinator, and wherein the coordinator is configured to store the information about the operational capability of the first node in the non-volatile memory.

11. The bus arrangement according to claim 8,
wherein the first node is configured such that, for the activation of the second node, the first node switches the switchable current sink between a conducting state and a non-conducting state, and
wherein the second node is configured to detect the change in an input voltage of the second node using the comparator.

12. A method for operating a bus arrangement, the method comprising:
in a configuration phase performing the following operations:
establishing a connection from a coordinator to a first node via a bus, the first node having a first serial number;
transmitting the first serial number from the first node to the coordinator via at least one bus line of the bus;
storing the first serial number in a non-volatile memory of the coordinator;
establishing a connection from the coordinator to a second node via the bus, the second node having a second serial number;
transmitting the second serial number from the second node to the coordinator via the at least one bus line; and
storing the second serial number in the non-volatile memory of the coordinator,
wherein the bus comprises:
a first signal line, which couples the first node and the coordinator; and
a second signal line, which connects the second node to the first node, and
wherein the at least one bus line connects the coordinator to the first and the second nodes.

* * * * *